United States Patent Office 2,813,996
Patented Nov. 19, 1957

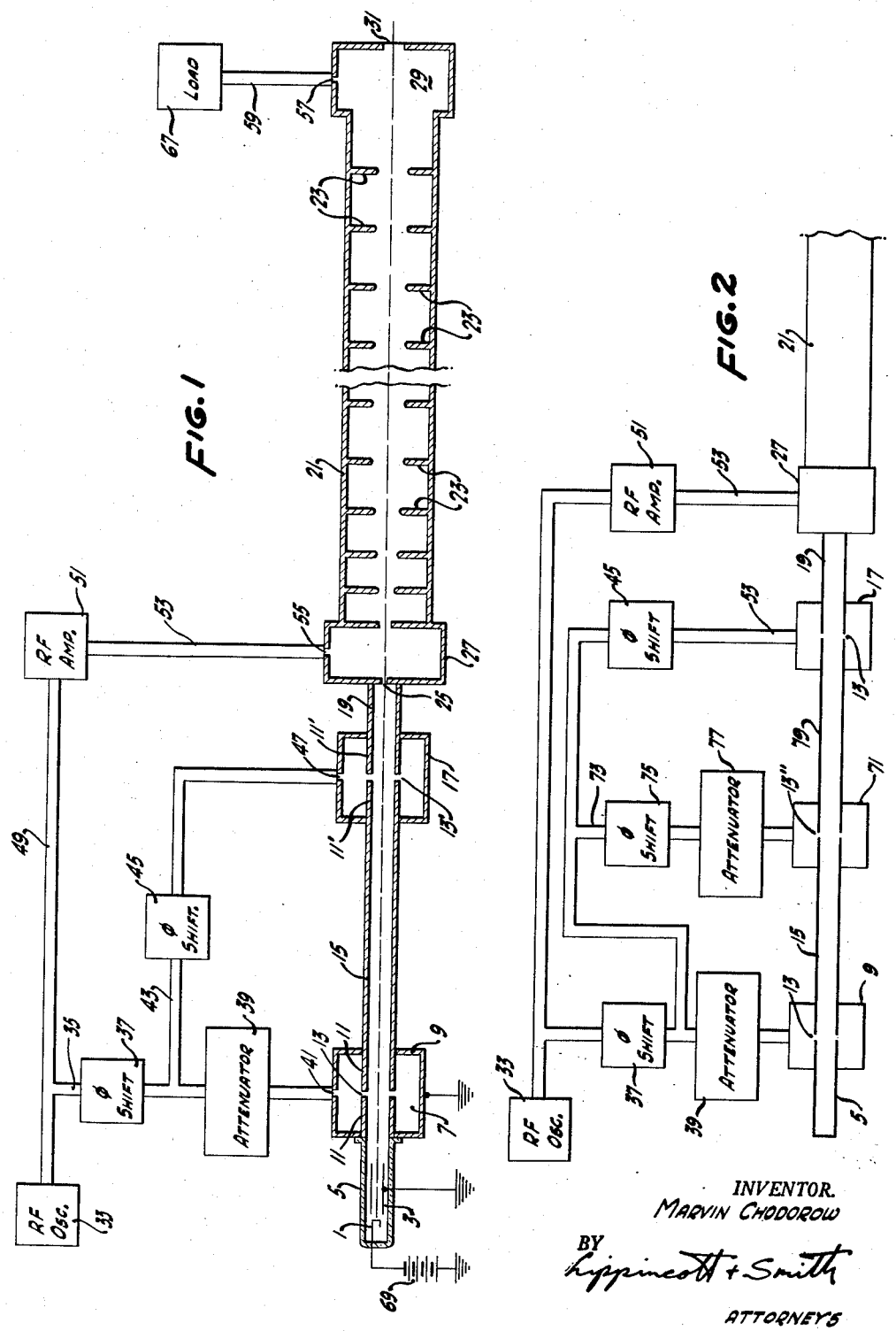

2,813,996

BUNCHING MEANS FOR PARTICLE ACCELERATORS

Marvin Chodorow, Menlo Park, Calif., assignor to The Board of Trustees of the Leland Stanford Jr. University, Stanford University, Calif Application December 16, 1954, Serial No. 475,806

13 Claims. (Cl. 315—5.42)

This invention relates to particle accelerators of the linear type. It is particularly adapted to electron accelerators, but the principles and practices involved are also adapted to the acceleration of heavier particles, and although the major portion of the description which follows will refer to electron accelerators, those skilled in the art will understand the modifications and adaptations necessary to apply the principles to heavy-particle accelerators.

In apparatus of the type under consideration a stream of the particles to be accelerated is injected into a wave guide or equivalent structure which is so loaded that the phase velocity of waves propagated therethrough is as low as or lower than the speed of light. Characteristically, such a structure takes the form of a "disc-loaded" wave guide. This is a tubular conductor having annular, internally-projecting flanges spaced therealong at accurately determined intervals. The phase velocity of radio frequency waves set up in such a guide depends upon the spacing, the thickness, and the diameter of the central openings in the annular flanges, these factors being computed for the specific frequency at which the wave guide is intended to be operated. The structure is so designed that at its input end the velocity of wave-propagation within the guide is substantially equal to the velocity of the particles injected therein. This usually means that in the initial portion of the guide, where the particles are injected, the phase velocity is materially lower than that of light, increasing along the length of the structure to some final value. If the particles injected are electrons, the initial, variable-velocity portion of the guide may be relatively short, the electrons achieving substantially the velocity of light within a foot or so of their point of injection.

It will be seen that the structure as above described could equally well be defined as a succession of coupled cavity resonators. In certain types of apparatus the latter description, or a description as a single, highly complex, resonant cavity, might appear to be more recognizable than the description as a wave guide. The latter description, however, is convenient and will be the one adopted throughout this specification.

Whatever physical form the device may take, high-frequency waves are established at the end of the device at which the particles are injected, these waves being established in a mode wherein there is a longitudinal component of the electrical field to which the particles are subjected. Those particles which enter the structure in the phase of the oscillations transmitted by it such that the longitudinal field is in the direction of propagation of the particles and is at or near its maximum, are constantly accelerated, gaining in energy as they travel along the length of the guide. Where the particles are electrons the gain in velocity becomes very small after the initial portion of the guide has been passed, the energy gained being effective very largely as an increase in mass.

Particles entering the structure out of phase with the crests of the radio frequency waves therein are very largely wasted. During one-half of the wave the accelerations applied by the electric field decrease the energy of the particles instead of increasing it. The result is that at least half of the particles are lost entirely, while the energy imparted to others, which do make their escape from the structure, may vary over a relatively wide range.

At the frequencies employed in apparatus of this kind it is difficult so to control the emission of the particles that they are emitted from their source, whatever it may be, in "bunches," coincident with the crests of the accelerating waves. It has been customary, therefore, in past practice, to inject the particles as a continuous stream and accept the loss of particles and the waste of power that such loss involves. In electronic accelerators at least a partial relief from this situation is obtained by so designing the initial proportion of the guide that it acts as a combined accelerator and buncher. This itself involves a loss, since the phase of the radio-frequency wave at which optimum bunching effect occurs is displaced by 90° from that resulting in maximum acceleration, and therefore efficiency in both bunching and acceleration is sacrificed by accomplishing bunching in the accelerator itself. The accelerator proper is heavy and bulky, and it must be supplied with high power in order to perform its intended function. The resistance loss in the device is substantially proportional to the power supplied to it. There is, of course, a constant attenuation of waves transmitted along the loaded wave guide, and hence, even if the bunching per se absorbed no power, the mere length of the guide devoted to the relatively inefficient bunching portion results in a radio-frequency power loss as well as in a wasteful use of the beam electrons.

Broadly, the purpose of the present invention is to provide means for injecting electrons into the wave guide portion of the accelerator with a distribution in phase leading to maximum utilization of the electrons injected, thus to provide a minimum proportion of wasted electrons, to obtain a minimum dispersion in energy in the electrons emergent from the guide and to give a maximum amount of energy to the emergent electrons. More specifically, among the objects of the invention are to provide means for injecting into the loaded wave guide constituting the major portion of the device electrons having a minimum dispersion in phase; to provide means for injecting previously bunched electrons into the guide in proper phase to receive maximum acceleration in their passage through the guide; to provide a means for bunching electrons injected into a wave guide which is operative at low power and high efficiency; to provide a wave guide which will give the emergent electrons maximum energy for a given length of wave guide; and to provide a linear accelerator which is efficient both as to the use of the radio-frequency power supplied thereto in producing acceleration and in the percentage of the total number of electrons injected therein which receive such acceleration.

Considered broadly, the electron accelerator of this invention comprises, in addition to a loaded wave guide of the general type already described and an electron gun which is electrically alined with the wave guide for generating a beam of electrons, so as to direct the beam axially therethrough, of a resonant cavity surrounding the path of electrons from the gun, followed by a drift tube, also surrounding the electron path, interposed between the gun and the accelerator-guide. A radio frequency source or driver supplies energy at a relatively low level to the resonant cavity. Means are provided for supplying the guide with radio frequency energy of the same frequency, this preferably comprising a radio frequency amplifier driven by the source and having its output coupled into the wave guide, and means for adjusting the relative phase to the energy fed to both the cavity resonator and the wave guide. Preferably there is also provided at least one additional cavity, supplied by the same source, interposed along the electron path between the drift tube and the wave guide, together with means for adjusting the phase of the energy supplied to the additional cavity or cavities. In operation, the electron gun supplies a continuous, unmodulated electron stream. As this stream passes through the first cavity the electrons are subjected to either an acceleration or a deceleration, depending upon the phase of the cavity oscillation at which they enter. This first cavity, at least, is preferably made of the reentrant type, so that the maximum electrical field, to which the electrons are subjected, is developed across a very short gap and there is little change in phase during the transit of the electrons of the stream across the gap. Leaving the buncher the electrons pass into the drift tube where they are subjected to neither acceleration nor deceleration. The length of the drift space is so related to the intensity of the field applied to the electrons in passing through the cavity that at the output end of the drift tube the electrons which first enter the cavity at the beginning of a cycle have been slowed down to such a degree that the electrons of average velocity have caught up with them, while those entering the cavity in the latter part of the cycle have been accelerated to catch up with the average velocity electrons.

The drift tube can terminate directly in the accelerator-guide. Preferably, however, they first pass through at least one additional resonant cavity which is supplied with radio frequency energy in proper phase to accelerate the bunched electrons. The electric field to which the electrons are subjected in the second cavity can be materially higher than that provided in the buncher, and if properly positioned and phased substantially all of the electrons entering the accelerating cavity can do so in an accelerating rather than a retarding phase. Furthermore, by proper adjustment of both phase and relative field strength the electrons which were most retarded in the first cavity can be those most accelerated in the second. Additional drift space may be provided between the second cavity and the accelerator proper, to allow for some further bunching of the electrons, but because of their higher velocity in this region the space occupied by the drift tube may be more valuable than the advantage gained from it, and hence it may be omitted. In a preferred form of the invention, therefore, the electron gun operates at a relatively low potential, in the neighborhood of 1000 volts. The buncher cavity is supplied with a radio-frequency oscillation which will develop a field strength across the gap in the cavity of the order of one or two hundred volts. One or more additional cavities, operated at the same or approximately the same effective voltage, may be supplied if desired, and if properly phased additional buncher cavities will improve the bunching, i. e., supply electrons to the final or accelerator cavity more nearly in the same phase. The accelerator cavity is supplied with higher voltage radio-frequency, so phased that the bunched electrons pass through the accelerating gap at the peaks of the cycle and are accelerated to an energy of somewhere in the neighborhood of 80,000 electron volts, giving them approximately half of the speed of light. This increases their velocity approximately nine-fold, so that the electrical wavelength within the beam leaving the accelerator cavity is nearly nine times as great as in the drift tube between the cavities. The beam from the accelerator cavity then passes into the main accelerator, either directly or through a drift tube, as above mentioned. The main accelerator guide is so designed that in its initial portion the phase velocity of the waves propagated therein is substantially the same as the velocity of the electrons in the entering beam, and increases progressively along the guide until it is substantially equal to that of light and is uniformly of this value throughout the body of the guide.

The invention will be more clearly understood from the following description of certain preferred embodiments of the invention, taken in conjunction with the accompanying drawings wherein:

Fig. 1 is a drawing, partly schematic and partly in block form, of an embodiment of the invention wherein a single bunching cavity resonator and one accelerator cavity are provided ahead of the loaded accelerator-wave guide; and Fig. 2 is a similar diagram illustrating an embodiment of the invention utilizing two bunching cavities and an accelerator cavity as input to the accelerator wave guide.

The embodiment of the apparatus illustrated in Fig. 1 illustrates the invention in an embodiment adapted for the acceleration of electrons. The portion of the apparatus with which the invention is particularly concerned comprises an electron gun including an electron emitting cathode 1 associated with one or more accelerating anodes 3, cathode and anode being enclosed within an evacuated glass envelope 5. The gun is sealed to a reentrant cavity resonator 7 comprising a cylindrical body 9 with reentrant tubes 11 and 11' extending inwardly from the ends and separated by a small gap 13. The tube 11' is a continuation of a drift tube 15, which continues or is extended into a second cavity resonator 17, which may be substantially identical with the cavity resonator 7, and its parts are therefore identified by similar reference characters, distinguished by accents. It may, however, be desirable to make the gap 13' slightly wider than the gap 13. In the present case a short tubular connection 19, substantially similar to the drift tube, connects the cavity 17 with the main body of the electron accelerator.

The electron accelerator proper can be of a type similar to that described in the copending application, Serial No. 450,181, filed August 16, 1954, of Ginzton and Elderidge, now Patent No. 2,761,828. It comprises a tubular wave guide 21, of the disc-loaded type, the phase velocity and the group or energy velocity of the waves propagated therethrough both being decreased by loading discs 23, spaced along the guide at accurately determined intervals. The tube 19 connects into the guide through a small opening 25 in an input coupling cavity 27. In accordance with known practice, the initial portion of the wave guide 21 is "tapered"; that is, in this portion the loading discs 23 are spaced more closely together than in the body of the guide and the diameters of the central openings therein are smaller, both the spacing and the opening diameter being increased progressively, from disc to disc, until the uniform portion of the guide is reached. In the particular accelerator illustrated, in connection with which the present invention was originally employed, the length of the accelerator-guide is approximately six feet, the major portion being uniform. Accelerators of the same general character have, however, been built which are several hundred feet long, and the invention is equally applicable irrespective of whether the length of the accelerator is six feet, and the energy imparted to the electrons in traversing it is, say 30 million electron volts, or whether it be several hundred feet long and the electron energy is of the order of magnitude of a billion electron volts or more.

Whatever the length of the accelerator guide, it may terminate in a coupling cavity 29, substantially similar to the input cavity 27. This cavity may, if desired, be provided with a Lenard window 31 in line with the electron beam, to permit the egress of the latter, and any desired equipment for the use of the bunched beam can be appended. On the other hand, particularly for the shorter type of accelerator, a target suitable for the emission of X-rays may be permanently sealed to the device and evacuated together with the portions of the structure already described. The present invention is not concerned with the ultimate use of the accelerated electrons.

For exciting the device thus far described, there is provided a radio-frequency oscillator 33, such as a klystron or magnetron, for generating oscillations in the microwave range. The oscillator 33 connects to a system of radio-frequency transmission lines, preferably of the wave guide type. Transmission line 35 connects to a phase-shifter 37, and thence through an attenuator 39 into the bunching cavity 7 through a matching iris 41.

A branch line 43, connected between the phase shifter 37 and the attenuator 39, connects through a second phase-shifter 45 into the accelerator cavity 17 through the iris 47. Another transmission line 49 connects directly from the oscillator 33 to a radio-frequency power-amplifier 51, which supplies high-power energy at the frequency of the source 33 through a wave guide 53 and iris 55 to the input coupler 27 of the accelerator-guide.

Connecting into the coupler 29 at the output end of the accelerator, through a matching iris 57 and wave guide 59, is a load 67 for absorbing the radio frequency energy reaching the output end of the loaded wave guide. It has already been mentioned that the loading which decreases the phase velocity within the guide also decreases the envelope or energy velocity to a still greater extent; i. e., to perhaps one percent of the velocity of light. If radio-frequency energy from the source 33 is not provided continuously, but is pulsed, the length of the pulses being no greater than twice the time of propagation of waves from the input cavity 27 to the output cavity 29, any waves reflected from the output end will not reach the cavity 27 until the instant when the pulse of excitation terminates, and therefore will have no effect upon the apparent impedance into which the amplifier 51 is connected. Furthermore, in a guide of any material length, the reflected waves alternately accelerate and decelerate the electrons to equal degrees, and therefore have no ill effect upon the over-all operation of the accelerator, and hence it is not strictly necessary to provide a load 67 nor the coupling cavity which connects it to the guide if pulsed operation is used. This portion of the set-up is therefore optional.

Several types of equipment are available for use as the phase shifters 37 and 45. They may, for example, be of the slotted wave guide type illustrated in "Microwave Transmission Circuits" (Ragan, vol. 9, Radiation Laboratory Series, McGraw-Hill, 1948, page 113), or they may be of the dielectric type illustrated in the same work at page 514. The attenuator 39 may comprise a losser element introduced into the wave guide. Several attenuators, suitable for use in connection with the present invention, are illustrated and described in "Technique of Microwave Measurements," vol. 11 of the Radiation Laboratory Series above cited, pages 748 and following.

In the operation of the invention thus described the entire combination of the electron gun, buncher cavity, drift tube, accelerator cavity and the loaded wave guide 21 are evacuated; they may be either sealed off, or continuously pumped, depending upon the service for which the accelerator is used. In operation it is convenient to ground all portions of the equipment except the cathode of the electron gun. The latter is maintained, during operation, at a potential in the neighborhood of 1000 volts negative to ground, by a suitable source 69 indicated schematically as a battery.

Operated at this relatively low voltage the electron gun develops a continuous, unmodulated beam of electrons which passes axially down the entire length of the apparatus from the gun to the window 31. In their transit through the gap 13 the electrons constituting the beam are subjected to the field between the ends of the reentrant tubes 11, and their velocities are either increased during the "positive" or decreased during the "negative" half-cycles of the radio frequency field across the gap, "positive" in this connection being defined as the polarity which causes an increase in velocity of the electrons. The peak value of the voltage across the gap, for a gun voltage of 1000 volts, is preferably in the neighborhood of from two to three hundred volts, and the velocity of the electrons of the beam is sufficiently high and the gap 13 is so short that there is little change in the potential across the gap during the instant of transit. After passing through the gap the electrons enter the drift tube 15, at velocities which depend on the voltage through which they have fallen in traversing the gap. Tube 15 is preferably made three or four "wavelengths" in length, a wavelength, in this context, meaning twice the distance traversed by electrons of the beam which pass through the gap at the instant of zero voltage across it in the interval between their transit through the gap and the next instant of zero gap voltage. An equivalent definition is the average distance traversed by the electrons of the beam in one cycle of the radio-frequency energy exciting the cavity.

It can be shown that best bunching occurs when $$n\pi \frac{V_1}{V_2} = 1.84$$

where $n$ is the length of the drift tube in wavelengths, as above defined, $V_1$ is the peak voltage across the gap 13 and $V_2$ is the direct voltage between the cathode 1 and the anode 3. If $n$ equals 2 the optimum value of $V_1$ is 293 volts, whereas if $n$ equals 3 the optimum value of $V_1$ is 195 volts. The values involved are not critical, however, and errors in the value of $V_1$ of considerable magnitude can be tolerated. Quite satisfactory bunching is obtainable if the value of the expression given above lies anywhere between, say, one and two, rather than the theoretical exact value of 1.84.

The value of $n$ is determined by the length of the drift tube, the velocities imparted to the electron by the electron gun and the frequency of the oscillator 33. Ordinarily the entire accelerator is designed to operate at a specific frequency, and this frequency, taken in conjunction with the accelerating potential which it is desired to use on the electron gun, will determine the length of the drift tube.

The gap 13' in the accelerator cavity 17 is positioned the designed number of wavelengths $n$ along the drift tube from the gap 13, so that it is positioned where best bunching occurs. With a given design, wherein this intended position of best bunching is established, the attenuator 39 is adjusted to such value that the best bunching occurs at the gap, so that although the length of the drift tube determines the general range in which the potentials established across the bunching gap 13 should lie, in operation there is a considerable degree of latitude, through the adjustment of this attenuator.

The excitation of the accelerator cavity 17 is at a much higher level than that of the cavity 7, the peak value of the field across the gap 13' being, in the present case, around 80,000 volts. This would usually dictate that the gap 13' be materially longer than the gap 13 to avoid breakdown, but otherwise the resonators may be substantially similar. The phase shifter 45 is so adjusted that the peak potential across the gap 13' is developed in the epochs when the bunched electrons are traversing the gap. Assuming that the majority of electrons traverse the gap 13' at the peak voltage, this will raise their energy from 1000 to 81,000 electron volts, and disregarding the relativistic increase in mass of the electrons, will impart to them a velocity approximately nine times their average velocity in traversing the drift tube. Assuming a peak voltage of 200 across the buncher gap 13, the velocity of the electrons which have traversed the gap 13' will lie in the range between $K\sqrt{80,800}$ and $K\sqrt{81,200}$ meters per second, where $K = 594,500$. Taking the relativity factor into consideration the velocity will be about 13% less, but the difference in the velocities of the emergent electrons from the gap 13', assuming that they all pass through the gap at approximately the peak potential would be, therefore, only a small fraction of one percent.

The probability, of course, is that the assumption as to accuracy of bunching just made is not correct, and the dispersion in velocity and phase will be greater than that assumed, but the velocity differences will still be small. Because of the much greater "wavelength," of the electron bunches passing through the drift space 19, a much greater length would be required in this region to accomplish either additional bunching or unbunching. Since it is always desirable to conserve space and bulk in an apparatus of this character, and since bunching after the electrons have been accelerated to the 80,000 volt value would require a long drift tube to have any material effect, the portion 19 of the drift space is usually made short, so the electrons entering through the orifice 25 in the coupler 27 maintain substantially the same bunching that they had upon passing through the gap 13'. In practice the phase shifter 45 is set for the best or highest value of output energy, the final adjustment being made by cut and try to cause the bunches to enter the accelerator proper in phase with the "positive" crests of the waves in the guide.

On entering the coupler 27 the electrons are immediately subjected to the accelerating field provided by the amplifier 51, and from this point on the device operates in substantially the same manner as is the case in a conventional accelerator, where the electrons enter as a continuous stream. The difference, however, is that the phase shifter 37 is so adjusted that the already formed bunches of electrons are all subjected to the maximum accelerating field, and the tapered portion of the loaded wave guide can therefore be made considerably shorter than in the case of the conventional type of accelerator where a continuous, unmodulated beam of electrons is injected into the loaded guide.

From what has been indicated above it should be evident that the maximum bunching effect is obtainable with relatively slow electrons and that bunching is most effective in the epochs of the cycle where the accelerating field is changing most rapidly; i. e., when it is passing through zero. This, however, is precisely the time when there is no acceleration of the electrons, and where the bunching is obtained within the major portion of the accelerator it is therefore highly inefficient. In effect, where electrons are injected as a continuous stream, those which enter the loaded guide during the portions of the cycle close to the accelerating peak are accelerated and enter into the useful output of the device, whereas those which enter in epochs of low or reverse potential are almost entirely wasted. Some bunching therefore occurs in the conventional type of accelerator, but this is a highly inefficient process. Initial bunching, as effected by the apparatus here described, can therefore raise the effectiveness of a particle accelerator of this type by several fold in comparison with the conventional type, assuming an equally prolific source of electrons in the gun. Furthermore, the electrons entering the accelerator in the wrong phase for acceleration absorb power, which is wasted as heat.

The principal parts of the embodiment of the device shown in Fig. 2 may be identical with those shown in Fig. 1. These parts are identified with the same reference characters as those used in Fig. 1 and will not be again described. The apparatus differs from that of Fig. 1, however, in that two bunching cavities are used in advance of the accelerator cavity. The drift tube 15, instead of terminating in the accelerator cavity, terminates in a second bunching cavity 71, the drift tube 15' in this case being usually made somewhat shorter than in the form first shown. The cavity 71 is supplied with microwave power from the source 33 through a branch wave guide 73, a phase shifter 75 and an attenuator 77. Following the cavity 71 electrons passing through the gap 13" pass down a drift tube 79, through the accelerator cavity 17 and thence into the connection 19 to the coupler 27 and the loaded wave guide, where the major acceleration takes place, as before.

By properly phasing the excitation of the second buncher 71, the already bunched electrons passing through the gap 13" may have their velocities additionally varied, so that their bunching is materially improved, and they enter the accelerator cavity and the accelerator-guide proper with still less dispersion in phase than where a single buncher was employed.

Additional bunching resonators can be used with further improvement in operation. Whether the additional complication involved in the provision of such additional cavities warrant it depends on the requirements of the service for which the accelerator is to be employed. From the description already given the arrangement of such additional cavities should be apparent those skilled in the art.

The major advantage of the invention is, of course, the much higher effectiveness of the device in the utilization of the electrons supplied to it. It has, however, other decided operational advantages. Bunching of the electrons at relatively low velocities greatly shortens the apparatus for a given output electron density and energy. Since the electron gun is operated at low voltage, standard types, such as are used in ordinary cathode-ray tubes, may be employed. The lower D. C. voltage makes the operation of the apparatus simpler and safer. The bunching may be made as sharp and as accurate as desired.

The connections through which the various portions of the device are excited are those which have proved, in practice, to be the most convenient, but it should be evident that various other arrangements are readily possible. The use of relatively low power driver oscillator 33 for the bunching and pre-acceleration appears to be the logical one, but it is quite possible to use a high power oscillator, and by proper arrangement of phase shifters and attenuators to derive the excitation for all of the cavities from this single oscillator. The positions of the various phase shifters and attenuators may be rearranged in various ways to accomplish the same results as the arrangements shown. Such modifications should be self evident to those skilled in the art, however, and need not be described in detail.

Obviously it is also possible to use only the buncher cavity and drift tube and to inject the electrons directly from the drift tube into the loaded wave guide at low velocity, accomplishing all of the acceleration above the initial, 1000 volt acceleration, in the main accelerator. The use of the additional accelerator cavity, however, not only permits the addition of the present invention to conventional already existing accelerators designed for high velocity injection, but it permits the initial acceleration to be given in a relatively high impedance, high voltage cavity, which does not have to be matched to the impedance of a continuous guide, but may be kept electrically separate and thus raise the electron velocity to somewhere in the neighborhood of one-half the speed of light in a shorter distance and more efficiently than in the loaded guide. The latter operates best on high-velocity electrons. Compared to the fields which can be developed in a single cavity those in the accelerator are of relatively low intensity, and the device derives its effectiveness because the electrons are subjected to acceleration therein continuously over a long distance instead of instantaneously, in a narrow gap. In the preferred combination using a separate initial accelerating cavity, the functions of bunching initial acceleration, and final, high energy acceleration can all be effected at high efficiency.

It will be seen that, therefore, the invention is not limited to the particular embodiments shown, and these showings are not intended to be construed as limitations upon the scope of the invention. All intended limitations are expressed in the following claims.

I claim:

1. In combination with a linear particle accelerator comprising a loaded wave guide and a source for supplying radio frequency power to said guide, means for supplying a density-modulated beam of particles to said guide comprising a gun adapted to produce a constant-density beam, a cavity resonator surrounding the path of said beam, means for exciting said cavity resonator with radio frequency oscillations at the frequency of said source to velocity-modulate the beam passing therethrough, a drift tube surrounding the path of the velocity-modulated beam to permit bunching of the velocity-modulated particles, a second cavity resonator surrounding the path of the bunched particles, means for exciting said second cavity resonator with radio frequency oscillations of the frequency of said source, said gun, cavity resonators and drift tube being electrically alined with said loaded wave guide to direct particles therethrough, and means for relatively phasing the oscillations exciting said cavity resonators and said wave guide to cause said second cavity resonator and said wave guide to impart maximum acceleration to said bunched particles.

2. A particle accelerator comprising an evacuated envelope within which are included an electron gun adapted to produce a constant-density electron beam and means for modulating said beam and accelerating the electrons thereof comprising a first cavity resonator, a drift tube, a second cavity resonator and a loaded wave guide, each surrounding the path of said beam and mounted in succession therealong, and separate connections through said envelope for supplying radio frequency power to said cavity resonators and said wave guide.

3. A particle accelerator comprising an evacuated envelope within which are included an electron gun adapted to produce a constant density electron beam and means for modulating said beam and accelerating the electrons thereof comprising a first cavity resonator, a drift tube, a second cavity resonator and a loaded wave guide, each surrounding the path of said beam and mounted in succession therealong; a relatively low power source of radio frequency oscillations, a power amplifier, connections from said source to each of said cavity resonators and to said power amplifier, and connections from said power amplifier to said wave guide.

4. A particle accelerator comprising an electron gun adapted to produce a constant density electron beam and means for modulating said beam and accelerating the electrons thereof comprising a first cavity resonator, a drift tube, a second cavity resonator and a loaded wave guide, each surrounding the path of said beam and mounted in succession therealong, a relatively low power source of radio frequency oscillations, a power amplifier, connections from said source to each of said cavity resonators and to said power amplifier, connections from said power amplifier to said wave guide, and means in said connections for varying the relative phase of the oscillations supplied to said cavity resonators and said wave guide.

5. A particle accelerator as defined in claim 1 including at least one additional cavity resonator and drift tube interposed between said two mentioned cavity resonators for imparting additional components of velocity modulation to said electron beam, means for exciting said additional cavity resonator with radio frequency oscillations of the frequency of said source, and means for relatively phasing the oscillations exciting said additional cavity resonator.

6. In combination with a linear particle accelerator comprising a loaded wave guide and a source for supplying radio frequency power to said guide, means for supplying a density modulated beam of particles to said guide comprising a gun adapted to produce a substantially constant density beam of said particles, a cavity resonator surrounding the path of said beam, means for exciting said cavity resonator with radio frequency oscillations at the frequency of said source to velocity modulate the beam passing therethrough, a drift tube surrounding the path of the velocity modulated beam to permit bunching of the velocity modulated particles, said gun, cavity resonator, and drift tube being electrically alined with said loaded wave guide to direct said beam of particles therethrough, and means for relatively phasing the oscillations exciting said cavity resonator and said wave guide to produce maximum accelerating fields within said wave guide at the epochs of maximum density of the particles of the beam entering therein.

7. A particle accelerator comprising an evacuating envelope within which are included an electron gun adapted to produce a constant density electron beam, means for modulating said beam and accelerating the electrons thereof comprising a cavity resonator, a drift tube, and a loaded wave guide, each surrounding the path of said beam and mounted in succession therealong, and separate connections through said envelope for supplying radio frequency power to said cavity resonator and said wave guide.

8. A particle accelerator comprising an evacuated envelope within which are included an electron gun adapted to produce a constant density electron beam and means for modulating said beam and accelerating the electrons thereof comprising a cavity resonator, a drift tube, and a loaded wave guide, each surrounding the path of said beam and mounted in succession therealong; a relatively low power source of radio frequency oscillations, a power amplifier, connections from said source to said cavity resonator and to said power amplifier, and connections from said power amplifier to said wave guide.

9. A particle accelerator comprising an electron gun adapted to produce a constant density electron beam and means for modulating said beam and accelerating the electrons thereof comprising a cavity resonator, a drift tube, and a loaded wave guide, each surrounding the path of said beam and mounted in succession therealong, a relatively low power source of radio frequency oscillation, a power amplifier, connections from said source to said cavity resonator and to said power amplifier, connections from said power amplifier to said wave guide, and means for adjusting the relative phase of the oscillations supplied from said source to said cavity resonator and from said power amplifier to said wave guide.

10. A particle accelerator comprising an electron gun adapted to produce a constant density electron beam and means for modulatng said beam and accelerating the electrons thereof comprising a cavity resonator, a drift tube, and a loaded wave guide each surrounding the path of said beam and mounted in succession therealong, means for exciting said cavity resonator with radio frequency oscillations of relatively low power, means for exciting said wave guide with radio frequency oscillations of identical frequency and of relatively high power, and means for adjusting the relative phase of the oscillations exciting said cavity resonator and said wave guide respectively.

11. A particle accelerator comprising an electron gun adapted to produce a constant density electron beam and means for modulating said beam and accelerating the electrons thereof comprising a cavity resonator, a drift tube, a second cavity resonator and a loaded wave guide, each surrounding the path of said beam and mounted in succession therealong, means for exciting said cavity resonators and said wave guide with radio-frequency oscillations of identical frequency, and means for adjusting the relative phase and amplitude of the oscillations exciting said resonators respectively and said wave guide.

12. A linear particle accelerator comprising a gun adapted to produce a substantially constant-density concentrated beam of relatively low velocity particles, means for bunching and accelerating said particles comprising in succession along and surrounding the path of said beam, a cavity resonator adapted to velocity-modulate said beam, a drift tube wherein velocity-modulated particles of said beam tend to bunch and a loaded waveguide; and means for supplying radio frequency oscillations of the same frequency to said cavity resonator and said waveguide respectively at relative phases and amplitudes such as to density-modulate said beam by bunching the particles thereof at their point of entry into said waveguide and to accelerate the bunched particles to a relatively high velocity in their passage through said waveguide.

13. A linear electron accelerator comprising an electron gun adapted to produce a concentrated electron beam of relatively low voltage and substantially constant density, means for bunching and accelerating the electrons of said beam comprising, in succession along and surrounding the path thereof a first cavity resonator adapted to velocity-modulate said beam, a drift tube, a second cavity resonator, and a loaded waveguide; and means for exciting both of said cavity resonators and said waveguides with electrical oscillations of the same radio frequency and such relative phase and amplitude that electrons of said beam are bunched to substantially the maximum attainable degree due to their velocity modulation in said first resonant cavity at their entrance into said second resonant cavity and enter said loaded waveguide at the phase of excitation thereof to produce maximum acceleration of said electrons.

References Cited in the file of this patent
UNITED STATES PATENTS

| | | |
|---|---|---|
| 2,556,978 | Pierce | June 12, 1951 |
| 2,595,698 | Peter | May 6, 1952 |
| 2,698,381 | Robertson et al. | Dec. 28, 1954 |